United States Patent [19]

Nilsson et al.

[11] 4,261,939
[45] Apr. 14, 1981

[54] METHOD AND AN ARRANGEMENT FOR THE MANUFACTURE OF A MATERIAL WEB OF FOAMED THERMOPLASTICS

[75] Inventors: Lennart Nilsson, Lund; Sven-Olof Andrén, Staffanstorp; Per-Allan Ljungberg, Lund, all of Sweden

[73] Assignee: Tetra Pak International AB, Lund, Sweden

[21] Appl. No.: 64,769

[22] Filed: Aug. 8, 1979

[30] Foreign Application Priority Data

Aug. 22, 1978 [SE] Sweden .................... 7808847

[51] Int. Cl.³ ............................................ B29D 27/00
[52] U.S. Cl. .................................... 264/51; 264/564; 425/133.1; 425/817 C
[58] Field of Search .................. 264/51, 53, 48, 564; 425/817 C, 133.1

[56] References Cited

U.S. PATENT DOCUMENTS

| | | |
|---|---|---|
| 2,917,217 | 12/1959 | Sisson . |
| 3,539,666 | 11/1970 | Schirmer .............................. 264/51 |
| 3,560,600 | 2/1971 | Gliniecki .............................. 264/48 |
| 3,751,537 | 8/1973 | Scotto et al. . |
| 3,775,035 | 11/1973 | Scotto et al. . |
| 3,835,209 | 9/1974 | Karabedian . |
| 3,864,444 | 2/1975 | Johnson .............................. 264/48 |
| 3,871,802 | 3/1975 | Blackwelder . |
| 3,985,931 | 10/1976 | Blackwelder . |
| 4,009,976 | 3/1977 | Johnson ..................... 425/817 C X |
| 4,049,768 | 9/1977 | Luthra ........................ 425/817 C X |
| 4,160,638 | 7/1979 | Kolossow ................... 425/817 C X |

FOREIGN PATENT DOCUMENTS

| | | |
|---|---|---|
| 1803223 | 6/1969 | Fed. Rep. of Germany . |
| 2602024 | 7/1977 | Fed. Rep. of Germany . |
| 1444624 | 5/1966 | France . |
| 105759 | 5/1974 | German Democratic Rep. . |
| 371588 | 10/1963 | Switzerland . |
| 523764 | 6/1972 | Switzerland . |

*Primary Examiner*—Philip Anderson
*Attorney, Agent, or Firm*—Burns, Doane, Swecker & Mathis

[57] ABSTRACT

A method and apparatus are disclosed for the manufacture of a web of foamed thermoplastic material. The material web is extruded to form a tubular member and then expanded by action of a compressed fluid so that the outside of the tubular member is forced against a calibrating element arranged adjacent the tubular member. The tubular member is then cooled to a temperature below the softening temperature of the material and then is cut and converted into web form.

22 Claims, 1 Drawing Figure

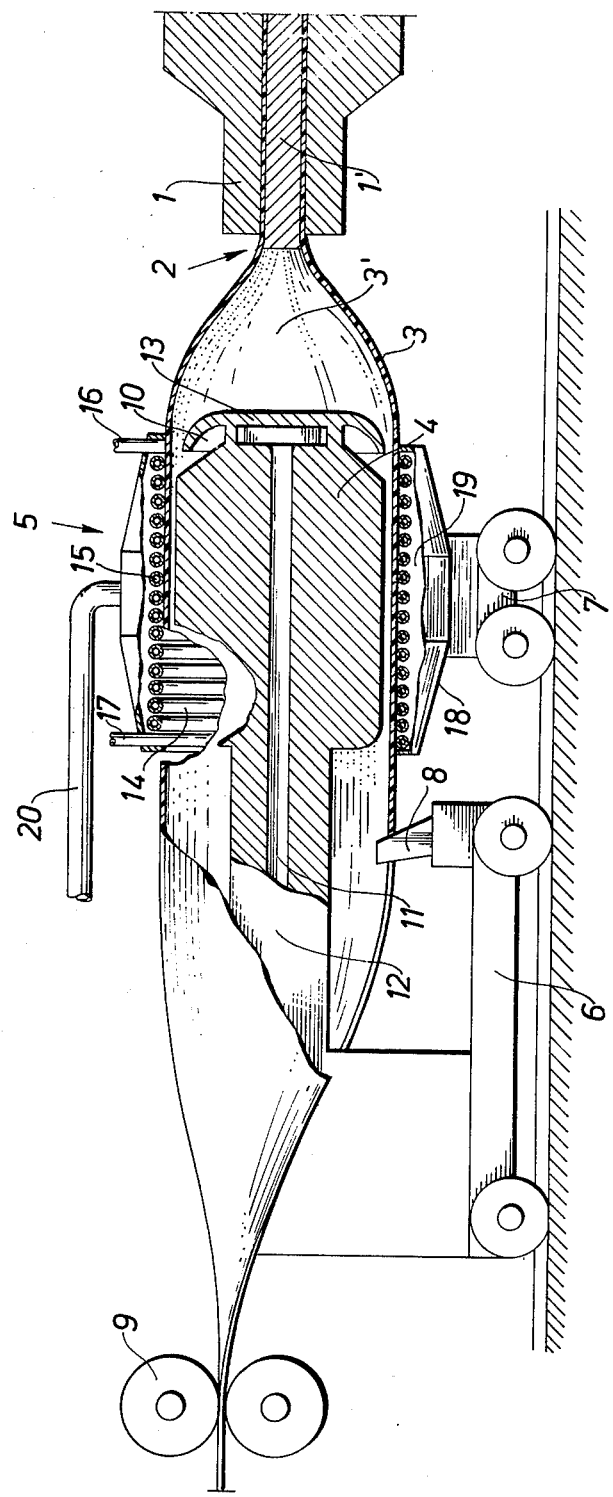

METHOD AND AN ARRANGEMENT FOR THE MANUFACTURE OF A MATERIAL WEB OF FOAMED THERMOPLASTICS

The present invention relates to a method for the manufacture of a material web of foamed thermoplastics by extrusion of the material to tubular form, calibration and cooling of the material tube, cutting it axially and conversion of it to web form. The invention also relates to an arrangement for the realization of the method.

In the packing industry, among others, sheets or films of foamed plastic material are used for different purposes. Whereas thicker foamed material, because of its shock-absorbing and protecting properties, has been used for a long time for the packing of easily damaged articles, the thinner sheets and films of foamed material have only in recent times found somewhat greater use in the packing industry. Thus at present various types of packing containers for liquid contents are manufactured from a foamed polystyrene material of a thickness of 0.5-1.0 mm. To increase the rigidity of the material and improve its impermeability characteristics, the material is laminated on at least one side to a relatively thin layer (thickness approx. 0.1 mm) of homogeneous polystyrene.

The layer of foamed polystyrene included in the abovementioned laminate is manufactured by extrusion. In present manufacturing techniques an extruder with an annular die is used, into which is introduced beside the thermoplastic material, e.g. polystyrene, also freon gas to enable foam production. After mixing and heating to melting temperature, the mixture is extruded through the annular die, whereupon the still soft material tube is expanded with the help of a mandrel to a tube of the desired circumference and material thickness (so-called calibration). The mandrel is normally designed with internal cooling channels so that the material tube, after it has attained the desired dimension can be cooled, so that the temperature of the material drops below the softening temperature and the tube is stabilized. After the cooling the tube is cut axially, whereupon the tube with the help of guide rollers or a guide plane is converted to flat shape and is rolled up or is subjected to further processing, e.g. lamination.

In the manufacturing procedure described it is of great importance that the cooling of the material should take place as rapidly and as uniformly as possible, if the material is to acquire the desired homogeneous foam structure. If the cooling is uneven or too slow, the expansion of the material will continue to some degree such that certain portions of the material will be expanded more than others and thus obtain lower density. Seen as a whole the material in such cases will also become non-uniform and "bumpy".

In their application for the manufacture of liquid-tight packing containers the foamed sheets are provided, as mentioned earlier, with at least one outer layer of homogeneous plastic material. This homogeneous plastic layer is applied to the surface of the foamed sheet by allowing the foamed sheet to pass an extruder die, from which the homogeneous film is extruded directly onto the surface of the plane foamed sheet. It is of the greatest practical importance that the surface of the foamed film should be as even as possible, since otherwise, in order to obtain the desired liquid-tight foamed layer, the foamed plastics would have to be covered with a relatively thick, homogeneous layer, which naturally implies an undesirable increase in material consumption.

In the extrusion the foamed material obtains, inevitably, a more or less uneven surface which presents a great number of craters and blisters. By the present manufacturing techniques described above, the non-uniformity of the surface of the material is increased, moreover, because the contact pressure of the extruded material against the mandrel as well as the cooling will be difficult to control and be uneven. If a relatively thick foamed material is manufactured (that is to say, if the material tube is not expanded to an appreciable degree after issuing from the extruder die), the mechanical processing and the cooling of the extruded tube can take place relatively close to the extruder die, which means that the processing will occur while the temperature of the tube is still relatively high, also the cooling can be performed rapidly and in a fairly controllable manner, as a result a homogeneous material with a relatively smooth and even surface is still obtainable. But in the case of the manufacture of thinner foamed material webs, the more substantial increase in diameter of the material tube requires greater space and the mechanical processing of the material must therefore take place at a greater distance from the extruder die. Since the material will also be thinner, it will cool off somewhat already before it reaches the calibrating mandrel, so that the desired uniform and controlled cooling will not be possible. Consequently the subsequent processing also does not provide any appreciable evening out of the surface. Thus such thinner material will obtain an appreciably less uniform surface, since the strong expansion also means that the craters and blisters in the material will be greater. On extrusion of a homogeneous plastic layer onto the surface of this foamed material, the thickness of the homogeneous plastic layer therefore has to be substantially increased in order to obtain a laminate of good impermeability for liquids.

It is an object of the present invention to provide a method for the manufacture of a material web of foamed thermoplastics which is not subject to the above-mentioned disadvantages.

It is a further object of the present invention to provide a method for the manufacture of a material web of foamed thermoplastics with homogeneous structure, which method makes it possible to manufacture thin material webs with even surfaces.

These and other objects have been achieved by the present invention through a method for the manufacture of a material web of foamed thermoplastics by extrusion of the material to tubular form, calibration and cooling of the material tube and axial cutting up of the same and conversion to web-form wherein the extruded tube is expanded by means of a compressed fluid so that the outside of the tube is made to lie against a calibrating element arranged outside the tube, whereupon the tube is cooled to a temperature below the softening temperature of the material.

A preferred embodiment of the method in accordance with the invention has been given the further characteristic that the compressed fluid is made to flow along the inner surface of the tube from a point at the same level as the front end of the calibrating element, seen in the direction of movement of the tube, axially in the direction of the movement of the tube.

A further embodiment of the method in accordance with the invention has been given the further characteristic that the rate of flow of the fluid appreciably exceeds the speed of the material.

A further embodiment of the method in accordance with the invention has been given the further characteristic that the compressed fluid serves as a cooling medium for the inside of the tube.

A further embodiment of the method in accordance with the invention has been given the further characteristic that the compressed fluid is air.

It is an object of the present invention also to provide an arrangement for the realization of the method in accordance with the invention.

This object has been achieved in accordance with the invention by an apparatus comprising an extruder for extrusion of thermoplastic material to tubular form, elements for the calibration and cooling of the material tube to the desired diameter and material thickness, cutting devices for the axial cutting up of the tube and elements for the conversion of the cut-up tube to substantially plane web-form which, has been given the characteristic that the calibration elements comprise a forming body situated inside the material tube with outflow openings for compressed fluid and a calibrating sleeve located at the same level as the forming body outside the material tube.

A preferred embodiment of the arrangement in accordance with the invention has been given the further characteristic that the working surface of the calibrating sleeve is profiled.

A further embodiment of the arrangement in accordance with the invention has been given the further characteristic that the working surface of the calibrating sleeve comprises cooling tubes wound helically around the inside of the sleeve.

A further embodiment of the arrangement in accordance with the invention has been given the further characteristic that the surface of the calibrating sleeve facing the forming body is provided with openings for the compressed fluid.

A further embodiment of the arrangement in accordance with the invention has been given the further characteristic that the forming body is substantially cylindrical with a diameter which is somewhat smaller than the desired inside diameter of the material tube, the outflow openings for the compressed fluid being arranged at the front end of the cylindrical body seen in the direction of movement of the material tube.

FIG. 1 shows a partial longitudinal section of a preferred embodiment of the arrangement in accordance with the invention.

The arrangement shown for the manufacture of a material web of foamed thermoplastics comprises a conventional high-pressure extruder (not shown) with a die portion 1 which has an annular outlet opening 2 for the extrusion of the foamed thermoplastic material in the form of a material tube 3. The central portion of the outlet opening is occupied by a core 1' by means of which the width of gap of the outlet opening can be varied. Directly in front of the outlet opening 2 the extruded material tube swells up to a so-called tube bubble 3'. At some distance from the outlet opening 2 the arrangement in accordance with the invention is provided with elements for the calibration and cooling of the material tube, these elements comprise a forming body 4 situated inside the material tube after the tube bubbles 3', and a calibrating sleeve 5 situated outside the material tube at the same level as the forming body 4. The forming body 4 and the calibrating sleeve 5 are carried by first and second carriages 6 and 7 which are movable in the direction towards or away from the die part 1. The first carriage 6 carrying the forming body 4 is provided at its front end facing in the direction towards the extruder with a cutting device 8 for the axial cutting up of the material tube 3. Also shown in the figure finally is a pair of rollers 9 for flattening the material tube 3 after it has been slit open.

The forming body 4 as mentioned earlier is situated inside the material tube 3. The forming body is centred accurately in line with the center axis of the die part 1 and has a diameter which is several times greater than the diameter of the outlet opening 2. At its end facing towards the die part 1 the peripheral surface of the forming body is provided with an annular outflow opening 10, which extends around the whole circumference of the forming body and is supplied with compressed fluid via a duct 11 running centrally inside the forming body 4. The duct 11 continues in the direction of flow of the material tube 3 through a connecting supporting axle in the forming body 4 and the carriage first 6, to be joined via the carriage first 6 and external pipes (not shown) to a pump or storage unit (not shown) for the compressed fluid. The annular outflow opening 10 is limited in the direction towards the die part 1 by a cap 13 which is streamlined and has a diameter which substantially corresponds to the diameter of the dylindrical main part of the forming body 4.

The calibrating sleeve 5 arranged at the same level as the forming body 4 is centered like the forming body 4 in relation to the extended center axis of the die part 1 and is movable in the direction towards or away from the die with the help of the second carriage 7, which similar to the first carriage 6 rolls on rails arranged parallel with the centre axis of the die part. The calibrating sleeve 5 has an inner diameter which exceeds the outer diameter of the forming body 4 and the calibrating sleeve 5 therefore can be moved freely over the forming body 4. The calibrating sleeve 5 can also be moved freely in over the front end of the die part. When the calibrating sleeve 5 and the forming body 4 are in the position shown on the drawing, an annular gap is formed between the outer, cylindrical surface of the forming body and the inner working surface of the calibrating sleeve 5. The width of the gap is adapted according to the material which is to be manufactured, but normally amounts to 3 times the material thickness. The material tube 3 during manufacture is in contact with the inner working surface 14 of the calibrating sleeve 5 which is profiled and preferably consists of cooling tubes 15 of copper or some other material of good thermal conductivity would helically around the inside of the sleeve. The two ends of the cooling tube 15 project from the calibrating sleeve 5 and form the inlet and outlet 16, 17 respectively for cooling fluid. The helically wound cooling tube 15 is supported by a surrounding sleevelike shell 18 which is firmly attached to the second carriage 7. In the embodiment of the calibrating sleeve 5 shown, the cooling tube 15 is wound so openly that a space of a few millimeters width exists between each turn of the winding, which makes possible the application of compressed fluid between the cooling tubes 15 against the outside of the material tube 3. The shell 18 is designed in such a manner that an annular duct 19 is formed around the outside of the helical cooling tube, which duct 19 may receive compressed fluid via a supply line 20.

In the manufacture of a material web of foamed thermoplastics in accordance with the method of this invention, the desired thermoplastics are supplied to the extruder in granular form. After heating of the granulate to melting temperature the thermoplastics are mixed with freon gas to form a homogeneous mixture which is pressed out via the die part of the extruder through the outlet opening 2 in the form of a tube. At the start of the production of calibrating sleeve 5 is displaced towards the right on the drawing to a position in which it surrounds the die part 1, at the same time as the forming body 4 has been displaced towards the left on the drawing, so that it is at a greater distance from the outlet opening 2 of the die part 1. When the continuous extrusion of the material tube through the outlet opening 2 has progressed for enough so that the tube substantially reaches up to the cap 13 of the forming body 4, the tube is expanded manually and slipped over the cap 13 as well as over the forming body 4. Subsequently the forming body 4 is moved progressively in the direction towards the die part 1 up to its position shown on the drawing, while at the same time the calibrating sleeve 5 is moved towards the left on the drawing to its working position at the same level as the forming body 4. The use of a compressed fluid, preferably compressed air supplied via the duct 11, ensures on the one hand that the material tube 3 issuing from the outflow opening 2 expands and forms a so-called tube bubble 3', on the other hand that the material tube 3 lies against the working surface in the calibrating sleeve 5 formed by the helically wound cooling tube 15. More particularly, compressed air is supplied continuously to the annular outflow opening 10 situated at the front end of the forming body 4, the compressed air builds up an inner pressure in the tube bubble 3', so as to ensure an even and uniform expansion of the material tube. The pressure in the tube bubble 3' is maintained substantially constant during the whole extrusion process. The bulk of the compressed air supplied via the outflow opening 10 flows, as soon as the pressure in the tube bubble 3' has built up properly, through the annular gap between the cylindrical working surface of the forming body 4 and the inner surface of the material tube 3, whereby the still soft material tube is pressed with simultaneous cooling against the profiled working surface 14 of the calibrating sleeve, which processes the passing material so that any blisters and craters in the material surface are evened out and the material obtains a smoother surface. By regulating the supply of the compressed fluid, the contact pressure against the working surface can be controlled. At the same time as a continuous cooling of the material tube 3 takes place from the inside with the help of the compressed air flowing along the inside of the tube, the material is cooled from the outside with the help of the cooling flowing through the cooling tube 15, which may consist of water which is passed into the cooling tube 15 via the inlet 16 and is conducted away via the outlet 17 at the opposite end of the shell 18.

In an embodiment of the invention it is possible, as mentioned earlier, to conduct a compressed fluid via the calibrating sleeve 5 towards the outside of the material tube 3. This is done with the help of an inlet pipe 20 through which the compressed fluid (preferably compressed air) is conducted to the annular duct 19 which distributes the compressed fluid around the whole circumference of the shell 18. The compressed fluid can flow therefore via the space between the winding turns of the cooling pipe 15 against the outside of the material tube 3 and then out into the atmosphere. The supply of compressed air on the one hand offers a further facility for the accurate controlling of the contact pressure of the material tube 3 against the working surface of the calibrating sleeve 5 (as a result of which the cooling effect too can be controlled and), on the other hand it offers a facility for the blowing clean of the working surface 14 of the powdery plastic scrapings which in continuous operation are formed owing to the material tube 3 lying against the cooling tube 15.

In continuous operation the material tube 3 issuing from the outlet opening 2 of the extruder, while continuing to be at a temperature which exceeds the softening temperature of the material, will thus be expanded by means of the pressure in the tube bubble 3', whereupon the expanded material tube, continuing its progress, will be pressed against the inside of the calibrating sleeve 5 by means of the compressed air so as to be calibrated to the desired diameter and material thickness on the one hand, and receive a surface treatment on its outside on the other hand, so that the blisters and craters formed during extrusion and expansion of the material tube will be evened out. When the material tube 3 has passed the two calibrating elements, that is to say the forming body 4 and the calibrating sleeve 5, its diameter has been accurately defined at the same time as the material has been cooled uniformly from the outside and from the inside so that it is in a stable state. The material tube 3 is then allowed to pass a cutting device 8, which is fixedly attached to the carriage 6 supporting the forming body 4. The cutting device 8 consists of an upright knife which, when the material tube 3 passes, divides it by a longitudinal cut. The divided material tube is then laid flat gradually (possibly by means of guiding surfaces not shown), whereupon it is permitted to pass a pair of rollers 9, which on the one hand ensure the final flattening and on the other hand contribute to the propulsion of the material web. The material web is then made to pass an extruder (not shown) for the extrusion of the homogeneous, sealing layer onto the side of the material web, which by means of the method in accordance with the invention has been made smooth.

The calibrating sleeve 5 is, as earlier discussed, preferably made up from one or more helically wound cooling tubes 15 which together form the working surface of the sleeve. Of course it is also possible to construct the working surface from some other unflexible material, e.g. a cylinder of steel which is provided with cooling means. In this connection it is of great importance that the working surface is profiled, e.g. by means of corrugating, as otherwise the slip resistance for the passing tube becomes too great. This occurs because the blisters and craters forming the surface of the tube give rise to a kind of "suction cup effect" that tends to lock the material against the working surface of the sleeve. This is efficiently avoided if the working surface is profiled, and furthermore the profiling promotes the mechanical working and smoothing of the surface of the tube.

Because of the method and arrangement in accordance with the invention a rational manufacture of thin foamed material of the type which is suitable for lamination with a homogeneous thermoplastic layer, which is impermeable to liquids, is made possible. The expanded layer will be homogeneous and obtain, beside a smooth and fairly crater-free surface, a very good internal quality with uniform pore size, since the cooling of the material tube from the outside as well as from the inside can be controlled, so that an optimum cooling is obtained which preferably should be of equal intensity from both directions, so that hardening of the material takes place substantially simultaneously through the whole thickness of the material. The method and arrangement according to the invention also make possible a well-balanced adaptation of the contact pressure between the material and the calibrating element, which previously had not been possible. By the formation of an annular space of only a few millimeters width between the cylindrical working surface of the forming body 4 and the inside of the material tube 3, the preconditions for a uniform and trouble-free pressing of the outside of the material tube against the working surface of the calibrating sleeve by means of the compressed air flowing through the space are created. Owing to the relatively high rate of flow produced thereby, the cooling effect on the inner surface of the material tube is also increased.

We claim:

1. In a method for the manufacture of a web of a foamed thermoplastic material wherein the material is extruded by means of an extruder to form a tube which is calibrated to provide a desired diameter and material thickness, the improvement comprising the steps of:
   extruding said foamed thermoplastic material in the form of a tube which encloses a forming element;
   continuously supplying a compressed gas through said forming element to the interior of said tube between said forming element and said extruder, said forming element and said tube cooperating to define a chamber, said compressed gas in said chamber having sufficient pressure to expand said tube; and
   surrounding said tube with a substantially cylindrical surface engaging the exterior surface of said tube adjacent said chamber whereby the pressure of said compressed gas in the tube urges the tube against said cylindrical surface which said tube is cooled and thereby calibrating said tube.

2. The method of claim 1 wherein said substantially cylindrical surface is provided within a sleeve spaced from and in concentric relationship to said forming element and further comprising the step of supplying compressed gas to said sleeve to urge the tube away from said substantially cylindrical surface and toward said forming element.

3. The method of claim 1 wherein the compressed gas is air.

4. The method of claim 1 wherein after the tube is calibrated and cooled, said tube is cut axially and urged to assume a substantially planar form.

5. The method of claim 1 wherein the compressed gas is conducted in the passageway at a linear speed substantially greater than a linear speed of the tube through the substantially cylindrical surface.

6. The method of claim 2 wherein the urging of the tube by the compressed gas supplied to the sleeve only partially counterbalances the urging of the tube by the compressed gas supplied by the forming element.

7. A method for the manufacture of a web of foamed thermoplastic material comprising the steps of:
   extruding from an extruder a heated, foamed thermoplastic material into a tube having a first diameter;
   expanding said tube so as to have a second diameter greater than said first diameter, said expansion of said tube defining a bubble immediately downstream of said extruder;
   conducting said expanded tube between an outer calibration member and an inner forming body;
   pressurizing said bubble with a pressurized gas supplied by said inner forming body;
   cooling said tube during said conduction between said outer calibration member and said inner forming body;
   longitudinally cutting said tube downstream of said conduction between said outer calibration member and said inner forming body; and
   subsequently flattening said cut tube.

8. A method for the manufacture of a web of foamed thermoplastic material comprising the steps of:
   extruding from an extruder a heated, foamed thermoplastic material into a tube having a first diameter;
   expanding said tube so as to have a second diameter greater than said first diameter, said expansion of said tube defining a bubble immediately downstream of said extruder;
   conducting said expanded tube between an outer calibration member and an inner forming body;
   pressurizing said bubble with a pressurized gas supplied by said inner forming body;
   simultaneously cooling said tube and limiting said expansion of said tube during said conduction between said outer calibration member and said inner forming body with said outer calibration member; and
   cooling an interior of said tube during said conduction between said outer calibration member and said inner forming member with said pressurized gas supplied by said inner forming member.

9. A method for the extrusion and calibration of a tube of foamed, thermoplastic material comprising the steps of:
   extruding from an extruder a foamed, thermoplastic material as a tube at a temperature sufficient to soften the foamed, thermoplastic material;
   immediately expanding said tube so as to increase a diameter of said tube by pressurizing a gas inside of said tube relative to an atmosphere outside of said tube said expanding tube defining a bubble immediately downstream of said extruder;
   calibrating said tube downstream of said extruding and said expanding by simultaneously cooling said tube to a temperature insufficient to soften the foamed thermoplastic material while limiting said expansion of said tube, said cooling being effected by thermally contacting a fluid at a temperature less than the tube with the tube in a spiral configuration coaxially aligned with the tube;
   limiting a contraction of said tube downstream of said extruding and said expanding by supplying a pressurized gas to an annular passageway defined by an inner surface of a tube and an outer surface of a forming body, the pressurized gas pressurizing said gas inside of said tube to expand said tube immediately downstream of said extrusion, said pressurized gas being vented through said passageway to the atmosphere, with said passageway being sufficiently narrow to maintain a desired pressure within said passageway and said bubble, said pressurized gas flowing through said passageway at a longitudinal speed substantially greater than a speed of said tube relative to the forming body.

10. A method for the extrusion and calibration of a tube of foamed, thermoplastic material comprising the steps of:

extruding from an extruder a foamed, thermoplastic material as a tube at a temperature sufficient to soften the foamed, thermoplastic material, said tube being extruded in a generally horizontal orientation;

immediately expanding said tube so as to increase a diameter of said tube by pressurizing a gas inside of said tube relative to an atmosphere outside of said tube said expanding tube defining a bubble immediately downstream of said extruder;

calibrating said tube downstream of said extruding and said expanding by simultaneously cooling said tube to a temperature insufficient to soften the foamed thermoplastic material while limiting said expansion of said tube, said cooling being effected by thermally contacting a fluid at a temperature less than the tube with the tube in a spiral configuration coaxially aligned with the tube, said limitation of expansion being effected both by the thermal contact with the fluid and by a pressurized gas provided in communication with an outer surface of the tube during said cooling;

limiting a contraction of said tube downstream of said extruding and said expanding by supplying a pressurized gas to an annular passageway defined by an inner surface of the tube and an outer surface of a forming body, the pressurized gas pressurizing said gas inside of said tube to expand said tube immediately downstream of said extrusion, said pressurized gas being vented through said passageway to the atmosphere, with said passageway being sufficiently narrow to maintain a desired pressure within said passageway and said bubble, said pressurized gas flowing through said passageway at a longitudinal speed substantially greater than a speed of said tube relative to said forming body;

longitudinally cutting said tube downstream of said calibrating; and flattening said tube downstream of said cutting.

11. Apparatus for the extrusion and calibration of a tube of both a predetermined thickness and a predetermined diameter of foamed thermoplastic material comprising:

extrusion means for extruding a material to form a tube of a first thickness and a first diameter;

a forming element disposed downstream of said extrusion means and having a substantially cylindrical surface with an outside diameter sufficiently less than said predetermined diameter so as to define an annular passageway between an interior surface of said extruded material and said substantially cylindrical surface of said forming element, said tube being extruded in an encompassing relationship with said substantially cylindrical surface;

a calibrating sleeve spaced from and in concentric relationship to said forming element and cooperating with said tube upon expansion to calibrate said tube, said calibrating sleeve having a surface with an inside diameter substantially equal to said predetermined diameter;

said forming element having means for supplying a compressed gas to a chamber defined by said tube between said extrusion means and said forming element to expand said tube, and for supplying said compressed gas to said passageway simultaneously to urge the tube against said surface of said calibrating sleeve and to cool said interior surface of said tube;

means to cool an exterior surface of said tube subsequent to being expanded; and means to axially cut said tube subsequent to being cooled.

12. The apparatus of claim 11 wherein the surface of the calibrating sleeve with an inside diameter substantially equal to said predetermined diameter is profiled.

13. The apparatus of claim 12 wherein said profiled surface of the calibrating sleeve is defined by a cooling tube wound helically within the interior of the calibrating sleeve.

14. The apparatus of claim 12 further comprising means for supplying a compressed gas to the calibrating sleeve, the profiled surface of the calibrating sleeve having openings for communicating the compressed gas with the exterior surface of the tube.

15. The apparatus of claim 11 wherein the forming element is substantially cylindrical.

16. The apparatus of claim 11 further comprising means to urge the cut tube to assume a substantially planar web form.

17. Apparatus for the extrusion and calibration of a tube of foamed, thermoplastic material comprising:

extrusion means for extruding a foamed thermoplastic material in the form of a tube at a temperature sufficient to soften the foamed thermoplastic material;

calibration means for calibrating said tube downstream of said extrusion means, said calibration means including cooling means for cooling the exterior surface of said tube, said calibration means defining a substantially cylindrical surface for limiting the diameter of the tube;

forming means for expanding said extruded tube, said forming means including means for supporting a forming body in said tube, said forming means being spaced from said extrusion means and substantially within said calibration means, said forming body having means for supplying a compressed gas to the interior of the tube between said extrusion means and said forming body.

18. The apparatus of claim 17 wherein said calibration means further comprises both an annular shell which encompasses said cooling means and means for supplying a compressed gas to the annular shell.

19. The apparatus of claim 18 wherein the cooling means includes means for permitting communication of said compressed gas supplied to the annular shell with an exterior surface of the tube.

20. Apparatus for the extrusion and calibration of a tube of a predetermined thickness and diameter of foamed, thermoplastic material comprising:

extrusion means for extruding a foamed thermoplastic material as a tube at a temperature sufficient to soften the foamed thermoplastic material;

calibration means for calibrating said tube downstream of said extrusion means, said calibration means including an annular shell coaxial with said extrusion means and longitudinally movable with respect to the extrusion means, cooling means for cooling said tube to a temperature insufficient to soften the foamed thermoplastic material, said cooling means including a spiral cooling tube coaxial with the extrusion means and arranged within said annular shell, said cooling tube being movable with said annular shell, and means for supplying a compressed gas to the annular shell to pressurize a chamber defined by said annular shell and an outer surface of said tube; and forming means for expanding said extruded tube, said forming means including a forming body coaxial with said spiral cooling tube and longitudinally movable both with respect to the extrusion means and with respect to the calibration means, said forming body having a diameter sufficiently less than said predetermined diameter of said tube to provide an annular passageway between an interior of said tube and said forming body, means for supplying a compressed gas to an interior of the tube by way of an annular outflow opening provided at an upstream end of the forming body with a supply duct of the annular outflow opening extending longitudinally downstream within the forming body.

21. Apparatus for the extrusion and calibration of a tube of a predetermined thickness and diameter of foamed, thermoplastic material comprising:

extrusion means for extruding a foamed thermoplastic material as a tube at a temperature sufficient to soften the foamed thermoplastic material;

calibration means for calibrating said tube downstream of said extrusion means, said calibration means including an annular shell concentrically arranged about said tube and longitudinally movable with respect to the extrusion means, cooling means for cooling said tube to a temperature insufficient to soften the foamed thermoplastic material, said cooling means including a spiral cooling tube coaxial with the extrusion means and arranged within said annular shell, said cooling tube being movable with said annular shell, and means for supplying a compressed gas to the annular shell, said compressed gas pressurizing a chamber defined by said annular shell and an outer surface of said tube;

forming means for expanding said extruded tube, said forming means including a forming body coaxial with said spiral cooling tube and longitudinally movable both with respect to the extrusion means and with respect to the calibration means, said forming body having a diameter sufficiently less than said predetermined diameter of said tube to provide an annular passageway between an interior of said tube and said forming body, means for supplying a compressed gas to an interior of the tube by way of an annular outflow opening provided at an upstream end of the forming body with a supply duct of the annular outflow opening extending longitudinally downstream within the forming body, a cap provided immediately upstream of the annular outflow opening and coaxially arranged at an upstream end of the forming body, the cap being streamlined with a diameter corresponding substantially to a diameter of the forming body, and means to axially cut said tube downstream of said calibration means including a knife.

22. Apparatus for the extrusion and calibration of a tube of a predetermined thickness and diameter of foamed, thermoplastic material comprising:

extrusion means for extruding a foamed thermoplastic material as a tube at a temperature sufficient to soften the foamed thermoplastic material, said extrusion means extruding said tube in a generally horizontal orientation;

calibration means for calibrating said tube downstream of said extrusion means, said calibration means including an annular shell carried on a first wheeled carriage, said shell being concentrically arranged about said tube and longitudinally movable with respect to the extrusion means, cooling means for cooling said tube to a temperature insufficient to soften the foamed thermoplastic material, said cooling means including a spiral cooling tube coaxial with the extrusion means and arranged within said annular shell, said cooling tube being movable with said annular shell, and means for supplying a compressed gas to the annular shell, said compressed gas pressurizing a chamber defined both by said annular shell and by an outer surface of said tubular member;

forming means for expanding said extruded tube, said forming means including a forming body carried on a second wheeled carriage, said forming body being coaxial with said spiral cooling tube and longitudinally movable both with respect to the extrusion means and with respect to the calibration means, said forming body having a diameter sufficiently less than said predetermined diameter of said tube to provide an annular passageway between an interior of said tube and said forming body;

means for supplying a compressed gas to an interior of the tube by way of an annular outflow opening provided at an upstream end of the forming body with a supply duct of the annular outflow opening extending longitudinally downstream within the forming body, a cap provided immediately upstream of the annular outflow opening and coaxially arranged at an upstream end of the forming body, the cap being streamlined with a diameter corresponding substantially to a diameter of the forming body, means to axially cut said tube downstream of said calibration means including a knife carried by said second wheeled carriage;

track means for aligning said first and second wheeled carriages with respect to the extrusion means; and roller means for flattening said tube downstream of said means to axially cut said tube.

* * * * *